United States Patent
Klopfenstein et al.

(10) Patent No.: US 12,545,220 B2
(45) Date of Patent: Feb. 10, 2026

(54) INTELLIGENT HYDRAULIC TRAILER BRAKE

(71) Applicant: CNH Industrial America LLC, New Holland, PA (US)

(72) Inventors: Matthew Klopfenstein, Chenoa, IL (US); Jerry L. Brinkley, Woodridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 1068 days.

(21) Appl. No.: 17/538,869

(22) Filed: Nov. 30, 2021

(65) Prior Publication Data
US 2023/0166701 A1 Jun. 1, 2023

(51) Int. Cl.
| | | |
|---|---|---|
| B60T 11/21 | (2006.01) | |
| B60T 7/20 | (2006.01) | |
| B60T 8/17 | (2006.01) | |
| B60T 8/1755 | (2006.01) | |
| B60T 13/66 | (2006.01) | |
| B60T 13/68 | (2006.01) | |

(52) U.S. Cl.
CPC .............. *B60T 8/1701* (2013.01); *B60T 7/20* (2013.01); *B60T 8/1755* (2013.01); *B60T 13/662* (2013.01); *B60T 13/686* (2013.01); *B60T 2240/00* (2013.01); *B60T 2250/04* (2013.01)

(58) Field of Classification Search
CPC ........ B60T 8/1701; B60T 8/1755; B60T 7/20; B60T 11/21; B60T 13/662; B60T 13/686; B60T 2240/00; B60T 2250/04
See application file for complete search history.

(56) References Cited

U.S. PATENT DOCUMENTS

| | | |
|---|---|---|
| 5,001,639 A | 3/1991 | Breen |
| 8,365,849 B2 | 2/2013 | Bartel |

(Continued)

FOREIGN PATENT DOCUMENTS

WO WO-2014/082693 6/2014

OTHER PUBLICATIONS

"Pneumatic Braking System Agriculture and Forestry", WABCO Product Catalogue 2017, https://www.wabco-customercentre.com/catalog/docs/8150100823.pdf, p. 104.

(Continued)

*Primary Examiner* — Thomas W Irvin
(74) *Attorney, Agent, or Firm* — Foley & Lardner LLP (57) ABSTRACT

Systems and apparatuses include a service brake system structured to selectively provide pressurized hydraulic fluid to a left service brake and a right service brake, and selectively output pressure to a pilot port; a hydraulic trailer brake system including a solenoid actuated intelligent brake turn actuator selectively allowing or inhibiting a flow of pressurized hydraulic fluid to a trailer brake work port; and one or more processing circuits that determine a current vehicle speed based on the information received from a wheel speed sensor, compare the current vehicle speed to a brake turn threshold speed, and actuate the intelligent brake turn actuator to inhibit the flow of pressurized hydraulic fluid to the trailer brake work port when the current vehicle speed is less than the brake turn threshold speed.

19 Claims, 4 Drawing Sheets

(56) References Cited

U.S. PATENT DOCUMENTS

| | | | |
|---|---|---|---|
| 8,684,472 | B2 | 4/2014 | Heren et al. |
| 8,820,855 | B2 | 9/2014 | Cadaddu |
| 9,108,691 | B2 | 8/2015 | Fanourakis et al. |
| 9,120,359 | B2 | 9/2015 | Chiu et al. |
| 9,764,722 | B2 * | 9/2017 | Casali ............... B60T 8/246 |
| 9,873,415 | B2 * | 1/2018 | Hill .................. B60T 11/21 |
| 10,029,660 | B2 | 7/2018 | Buchner et al. |
| 10,173,652 | B2 | 1/2019 | Schick et al. |
| 2015/0344011 | A1 * | 12/2015 | Casali ............... B60T 15/226 |
| | | | 303/7 |
| 2016/0214590 | A1 * | 7/2016 | Casali ............... B60T 7/042 |
| 2017/0240151 | A1 * | 8/2017 | Hill .................. B60T 8/1708 |
| 2018/0339687 | A1 | 11/2018 | Albright et al. |

OTHER PUBLICATIONS

New Holland Agriculture, "ABS and ABS SuperSteer: Leading Safety in Agriculture", 2013, p. 6.

* cited by examiner

INTELLIGENT HYDRAULIC TRAILER BRAKE

BACKGROUND

The present disclosure relates generally to hydraulic brake systems. More specifically, the present disclosure relates to hydraulic brake systems for a trailed implement.

SUMMARY

One embodiment relates to a vehicle that includes a left brake actuator structured to be engaged by an operator to apply left brakes; a right brake actuator structured to be engaged by the operator to apply right brakes; a wheel speed sensor structured to provide information indicative of a current speed of travel over ground of the vehicle; a service brake system coupled to the left brake actuator and the right brake actuator, selectively providing pressurized hydraulic fluid to the left brakes and the right brakes, and selectively outputting pressure to a pilot port; a hydraulic trailer brake system including an intelligent brake turn actuator including a solenoid actuated spool valve that selectively allows or inhibits a flow of pressurized hydraulic fluid to a trailer brake work port; and one or more processing circuits comprising one or more memory devices coupled to one or more processors, the one or more memory devices configured to store instructions thereon that, when executed by the one or more processors, cause the one or more processors to: determine the current vehicle speed based on the information received from the wheel speed sensor, compare the current vehicle speed to a brake turn threshold speed, and actuate the intelligent brake turn actuator to inhibit the flow of pressurized hydraulic fluid to the trailer brake work port when the current vehicle speed is less than the brake turn threshold speed.

Another embodiment relates to a hydraulic trailer brake system that includes a service brake system structured to selectively provide pressurized hydraulic fluid to a left service brake and a right service brake, and selectively output pressure to a pilot port; a hydraulic trailer brake system including a solenoid actuated intelligent brake turn actuator selectively allowing or inhibiting a flow of pressurized hydraulic fluid to a trailer brake work port; and one or more processing circuits comprising one or more memory devices coupled to one or more processors, the one or more memory devices configured to store instructions thereon that, when executed by the one or more processors, cause the one or more processors to: determine a current vehicle speed based on the information received from a wheel speed sensor, compare the current vehicle speed to a brake turn threshold speed, and actuate the intelligent brake turn actuator to inhibit the flow of pressurized hydraulic fluid to the trailer brake work port when the current vehicle speed is less than the brake turn threshold speed.

Still another embodiment relates to an apparatus that includes one or more processing circuits comprising one or more memory devices coupled to one or more processors, the one or more memory devices configured to store instructions thereon that, when executed by the one or more processors, cause the one or more processors to: determine a current vehicle speed based on the information received from a wheel speed sensor, compare the current vehicle speed to a brake turn threshold speed, receive a left service brake signal from a service brake system, receive a right service brake signal from the service brake system, and actuate an intelligent brake turn actuator of a hydraulic trailer brake system to inhibit a flow of pressurized hydraulic fluid to a trailer brake work port when the current vehicle speed is less than the brake turn threshold speed and one of the left service brake signal or the right service brake signal is received.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Following Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, an intelligent hydraulic trailer brake system for a vehicle of the present disclosure receives signals from a left brake pedal, a right brake pedal, and a wheel speed sensor. If the vehicle is travelling above a brake turn threshold speed (e.g., twelve kilometers per hour), then the intelligent hydraulic trailer brake system operates trailer brakes normally. During normal trailer brake operation, if an operator depresses the left brake pedal and/or the right brake pedal, service brakes of the vehicle are engaged and provide braking power to the vehicle and trailer brakes are engaged and provide braking power to the trailer. If the vehicle is travelling below the brake turn threshold speed and the operator depresses only one of the left brake pedal or the rear brake pedal, the trailer brakes are not applied and the trailer is allowed to continue moving without brake force. This allows the vehicle to be operated in a brake turn without dragging the trailed implement. The intelligent hydraulic trailer brake system includes a solenoid operated spool valve that selectively allows and inhibits engagement of the trailer brakes based on a position of the left pedal brake, a position of the right pedal brake, and a vehicle speed.

Overall Vehicle

Figure 1:
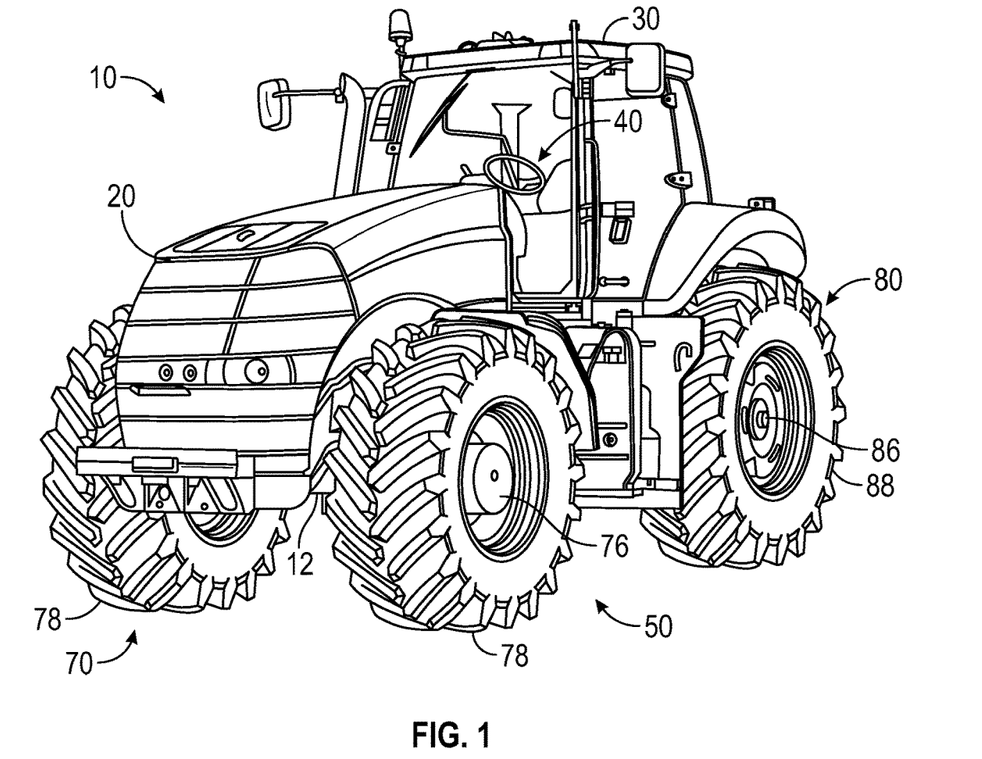
FIG. 1 is a perspective view of a vehicle, according to an exemplary embodiment.
Figure 2:
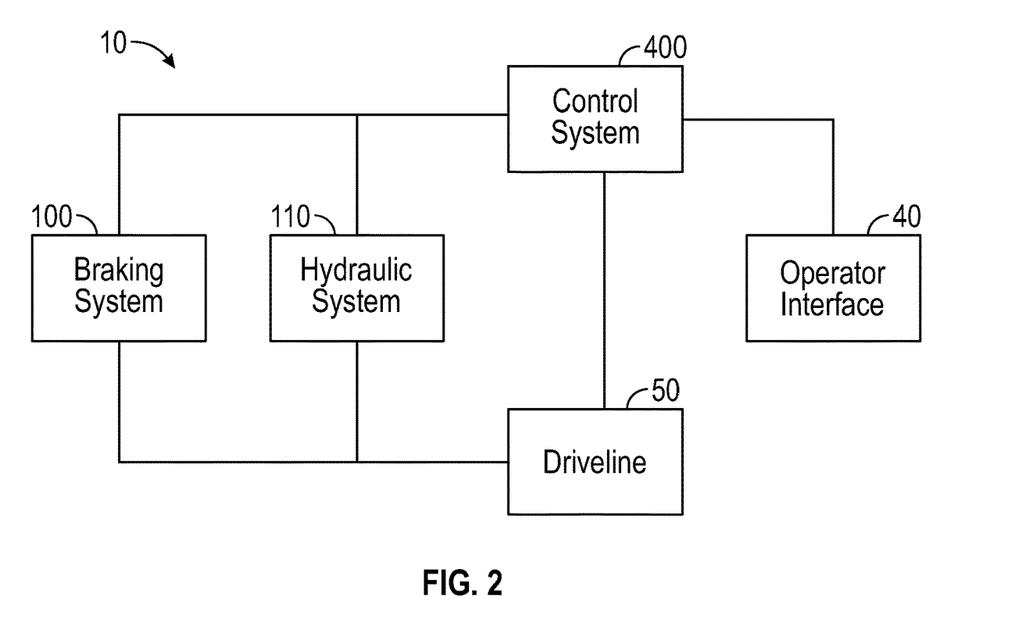
FIG. 2 is a schematic block diagram of the vehicle of FIG. 1, according to an exemplary embodiment.
Figure 3:
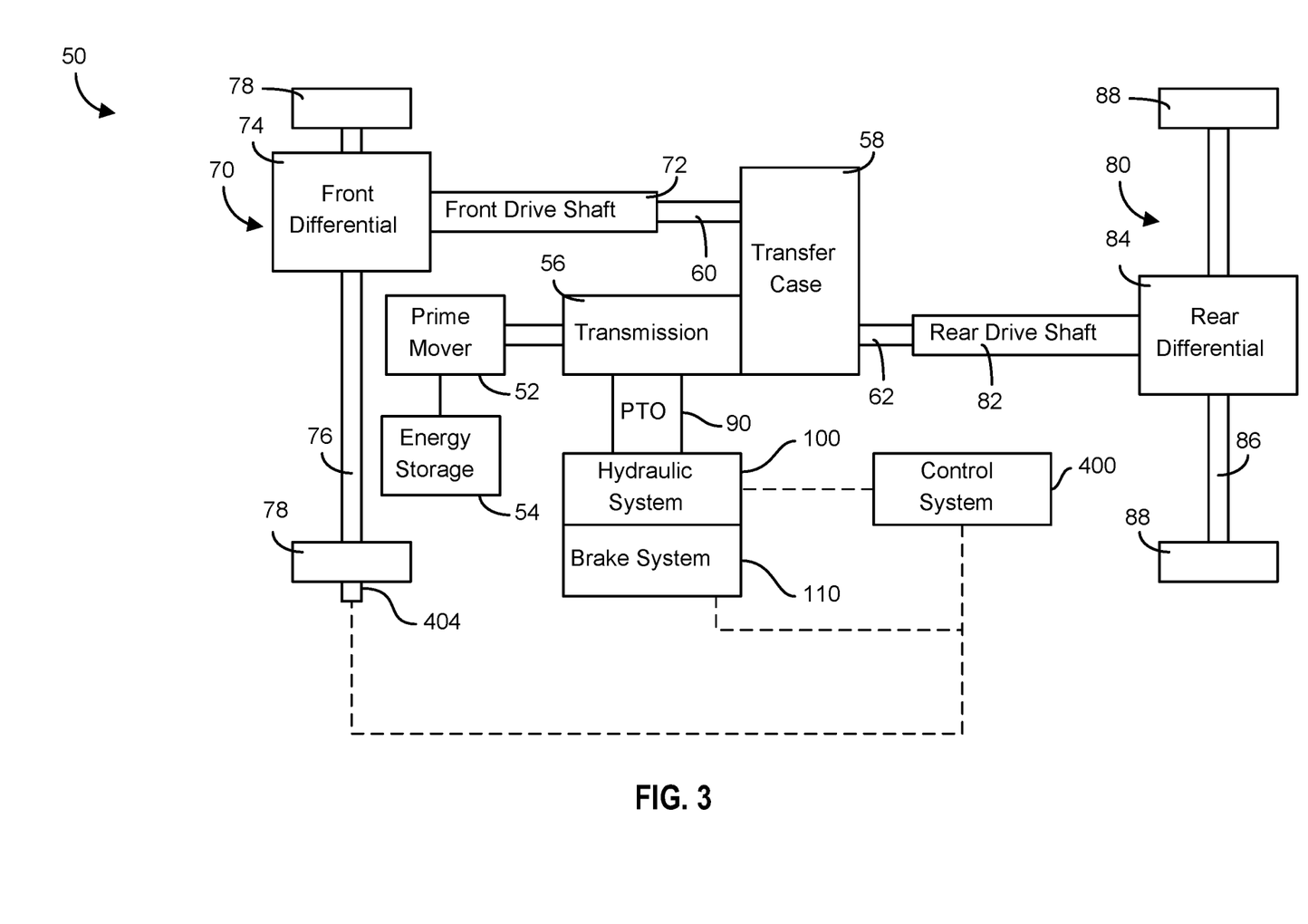
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a hydraulic system 100 for providing hydraulic power to vehicle systems or coupled implements; a vehicle braking system, shown as braking system 110, coupled to one or more components of the driveline 50 to facilitate selectively braking the one or more components of the driveline 50 or coupled implements; and a vehicle control system, shown as control system 400, coupled to the operator interface 40, the driveline 50, and the braking system 110. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., storing hydrogen, producing electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 110 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 110 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one or more tractive elements (e.g., wheels, etc.) of the trailed implement.

With continued reference to FIG. 3, the hydraulic system 100 may be driven by the PTO 90 (e.g., a belt driven output, a shaft driven output, an electric motor output from an electronic PTO, etc.). For example, the hydraulic system 100 may include a hydraulic pump and other components structured to provide pressurized hydraulic fluid for doing work on the vehicle 10. In some embodiments, the hydraulic system 100 may be directly driven by the prime mover 52, by a secondary prime mover (e.g., an electric machine, an onboard generator set, etc.) or by another portion of the driveline 50. The hydraulic system 100 may drive implements of the vehicle 10, the driveline 50, and/or a trailed implement.

Intelligent Hydraulic Trailer Brake

Figure 4:
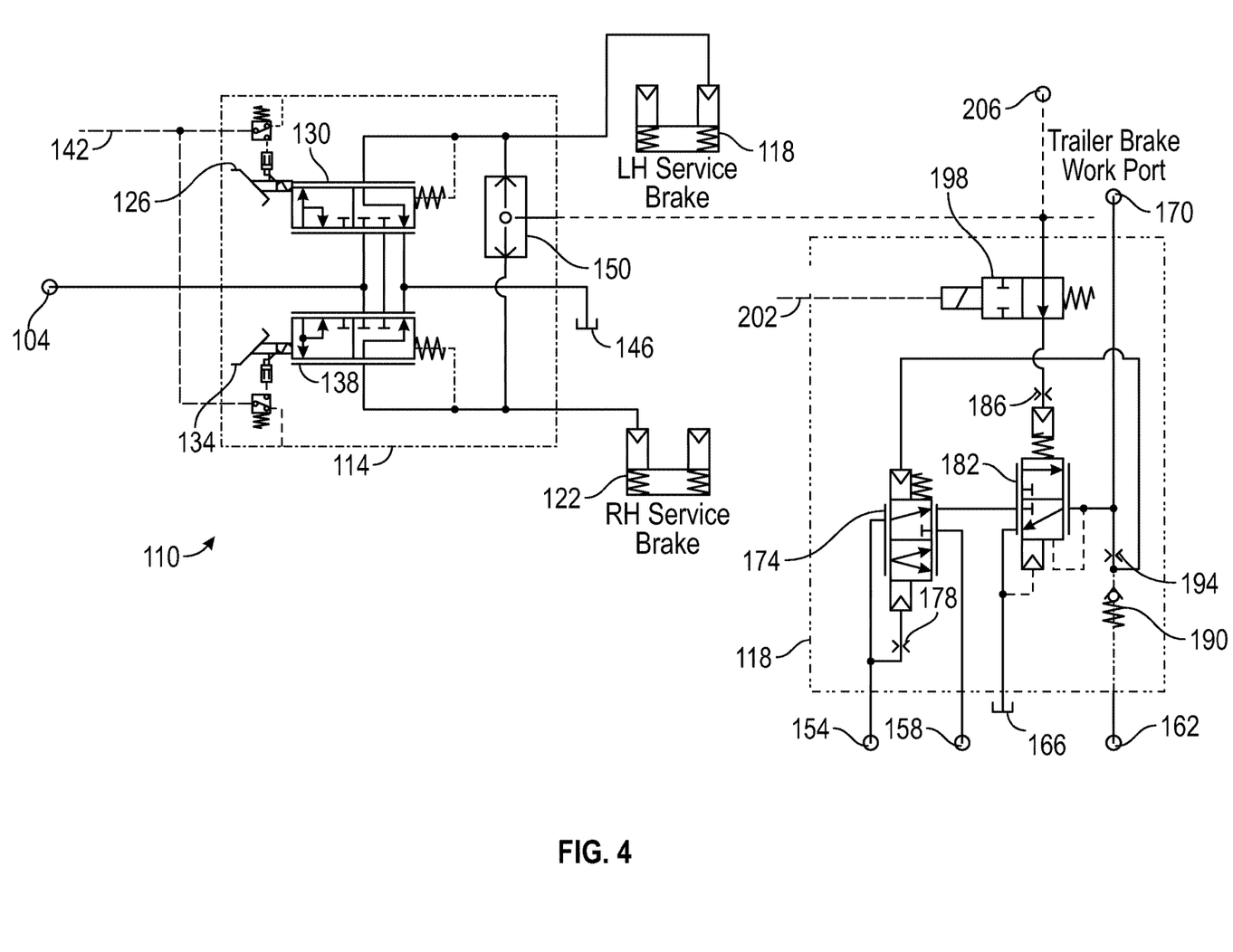
FIG. 4 is a schematic diagram of a hydraulic brake system of the vehicle FIG. 1, according to an exemplary embodiment.

As shown in FIG. 4, in some embodiments, the braking system 110 a service brake system 114 and a trailer brake system 118 coupled to a regulated supply 104 of the hydraulic system 100. The service brake system 114 controls a left service brake 120 and a right service brake 122. In some embodiments, the left service brake 120 applies braking to drivetrain 50 components on a left hand side of the vehicle 10 and the right service brake 122 applies braking to drivetrain 50 components on a right hand side of the vehicle 10 to slow each side of the vehicle 10 independently. In some embodiments, the independent control of the left service brake 120 and the right service brake 122 allow for brake turning of the vehicle 10. For example, the operator may apply the right service brake 122 when turning the vehicle 10 to the right in order to achieve a tighter radius right hand turn. Brake turning capabilities can be especially advantageous for large tractors used in field applications.

The trailer brake system 118 is used with a trailed implement and controls the application of brakes mounted on the trailed implement. During typical travel of the vehicle 10, application of the left service brake 120 and/or the right service brake 122 will cause the application of the trailer brakes. In some embodiments, it is not desirable to apply trailer braking when the operator is executing a brake turn maneuver. The service brake system 114 and the trailer brake system 118 are controlled to provide advantageous trailer braking when travelling, and inhibit trailer braking when executing a brake turn.

A brake turn threshold speed is stored by the controller 400 and compared to a current wheel speed determined based on one or more wheel speed sensors 404 (see FIG. 3). In some embodiments, the brake turn threshold speed is twelve kilometers per hour (12 kph). In some embodiments, the brake turn threshold speed is greater than 12 kph or less than 12 kph as desired. The controller 400 receives the current wheel speed, the brake turn threshold speed, and signals from the service brake system 114. The controller 400 communicates with the trailer brake system 118 to inhibit the application of trailer brakes when the current wheel speed is less than or equal to the brake turn threshold speed, and only one of the left service brake 120 or the right service brake 122 is applied. The controller 400 communicates with the trailer brake system 118 to apply the trailer brakes when the current wheel speed is greater than the brake turn threshold speed and only one of the left service brake 120 or the right service brake 122 is applied, or when both of the left service brake 120 and the right service brake 122 are applied simultaneously.

With continued reference to FIG. 4, the service brake system 114 includes a first brake actuator in the form of a left brake pedal 126 coupled to a left brake valve 130 and a second brake actuator in the form of a right brake pedal 134 coupled to a right brake valve 138. The left brake pedal 126 and the right brake pedal 134 are included in the operator interface 40 of the vehicle 10. In some embodiments, the left brake pedal 126 and the right brake pedal 134 are foot pedals manually manipulated by the operator. The left brake valve 130 provides selective communication between the regulated supply 104 of the hydraulic system 100 and the left service brake 120. The right brake valve 138 provides selective communication between the regulated supply 104 of the hydraulic system 100 and the right service brake 122. In some embodiments, the left brake pedal 126 is arranged for drive by wire by communication with the left brake valve 130, and the right brake pedal 134 is arranged for drive by wire by communication with the right brake valve 138.

In some embodiments, each of the left brake valve 130 and the right brake valve 138 are two position, four way valves that are spring biased toward an unapplied position where hydraulic pressure is inhibited from applying the left service brake 120 and the right service brake 122, and an applied position where hydraulic pressure is provided to the left service brake 120 and the right service brake 122. The left brake valve 130 and the right brake valve 138 are actuatable to the applied position by solenoids that are activated by the left brake pedal 126 and the right brake pedal 134 against the spring bias.

A park brake system 142 is also arranged in communication with both the left brake valve 130 and the right brake valve 138. When the park brake system 142 is energized (e.g., pressurized in a hydraulic park brake system, provided with an electrical signal or a lack of electrical signal for an electrical park brake system, etc.), each of the solenoids of the left brake valve 130 and the right brake valve 138 actuate the respective left brake valve 130 and right brake valve 138 and apply the brakes 120, 122.

A return 146 or sump is arranged in communication with the hydraulic system 100 to return or drain hydraulic fluid from the service brake system 114.

The service brake system 114 also includes a shuttle valve 150 arranged between the left service brake 120 and the right service brake 122. The shuttle valve 150 is movable in response to pressure provided to the left service brake 120 and the right service brake 122. When the left service brake 120 is pressured, the shuttle valve 150 is shifted and pressure is provided from the left brake valve 130 to a shuttle output 152. When the right service brake 122 is pressured, the shuttle valve 150 is shifted and pressure is provided from the right brake valve 138 to the shuttle output 152. When both the left service brake 120 and right service brake 122 are pressured, the shuttle valve 150 is shifted so that pressure is provided from both the left brake valve 130 and the right brake valve 138 to the shuttle output 152.

The hydraulic trailer brake system 118 includes a pressure supply port 154 in the form of a steering priority pressure supply port received from a steering system, a post trailer brake priority output port 158, a load sense port 162, a drain or return 166, a trailer brake working port 170 that selectively provides pressurized hydraulic fluid from the pressure supply port 154 to trailer brakes, and a pilot port 172 that receives hydraulic pressure from the shuttle output 152 of the service brake system 114. In some embodiments, the pressure supply port 154 receives pressurized hydraulic pressure from a steering system of the vehicle 10. For example, the steering system may be the highest priority system based on a load sense circuit and the hydraulic trailer brake system 118 only receives pressurized hydraulic fluid via the pressure supply port 154 when the hydraulic system 100 can provide adequate hydraulic power to operate both the steering system and the hydraulic trailer brake system 118.

A priority actuator 174 includes a two position, three-way hydraulic spool valve coupled between the pressure supply port 154, the post trailer brake priority output port 158, and a trailer brake actuator 182. The priority actuator 174 includes an orifice 178 that provides regulated hydraulic pressure to a first pilot biasing the spool toward a first position where hydraulic fluid is provided from the pressure supply port 154 to the trailer brake actuator 182 and the post trailer brake priority output port 158. A second pilot is structured to provide hydraulic pressure from a load sense system to the spool and to bias the spool toward a second position where hydraulic fluid is inhibited from communication between the pressure supply port 154 and the post trailer brake priority output port 158. A spring is arranged to bias the spool of the priority actuator 174 toward the first position.

The trailer brake actuator 182 includes a two position, three-way hydraulic spool valve coupled between the priority actuator 174, the trailer brake working port 170, the load sense port 162, and the return 166. The spool valve defines a first position where hydraulic fluid is provided from the priority actuator 174 to the trailer brake working port 170 and the load sense port 162, and flow is inhibited to the return 166. The spool valve also defines a second position wherein hydraulic fluid flow is provided between the trailer brake working port 170, the load sense port 162, and the return 166, and fluid flow from the priority actuator 174 is inhibited. The spool valve is biased toward the second position by a spring, a first pilot in communication with the return 166, and a second pilot in communication with the trailer brake working port 170. The spool valve is biased toward the first position by a third pilot selectively in communication with the pilot port 172 of the hydraulic trailer brake system 118 via a pressure regulator in the form of an orifice 186.

A load sense system in the form of a load sense valve 190 and a load sense regulator or orifice 194 are fluidly coupled between the trailer brake working port 170 and the load sense port 162 and may be connected to a load sense system of the hydraulic system 100. In some embodiments, pressure is provided from the orifice 194 to the second pilot of the priority actuator 174 for selective actuation of the priority actuator 174.

An intelligent brake turn actuator 198 is positioned between the pilot port 172 of the hydraulic brake system 118 and the third pilot of the trailer brake actuator 182. The intelligent brake turn actuator 198 includes a two position, two-way spool valve movable between a first position where communication is provided between the pilot port 172 and the third pilot of the trailer brake actuator 182, and a second position where flow is inhibited between the pilot port 172 and the third pilot of the trailer brake actuator 182. A spring biases the spool valve of the intelligent brake turn actuator 198 toward the first position. An electrically controlled solenoid (e.g., a normally off solenoid) is arranged to move the spool vale of the intelligent brake turn actuator 198 to the second position against the bias of the spring. The solenoid is controlled via the control system 400 via a communications line 202.

In some embodiments, the pilot port 172 of the hydraulic trailer brake system 118 is also connected to or in communication with a pilot supply-pneumatic trailer brake port 206 or another auxiliary port of the hydraulic system 100 or the brake system 110 for actuation in response to actions of the service brake system 114.

Figure 5:
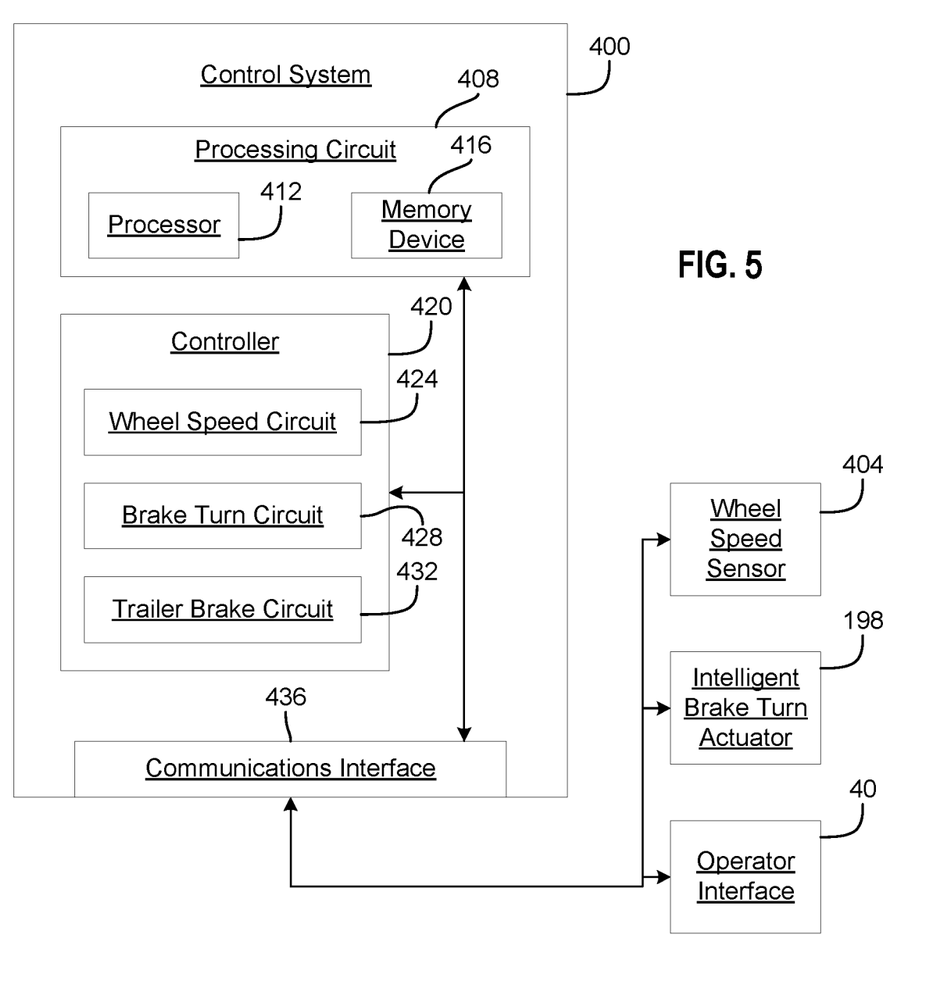
FIG. 5 is a schematic diagram of a control system of the vehicle of FIG. 1, according to an exemplary embodiment.

Referring now to FIG. 5, a schematic diagram of the control system 400 of the vehicle 10 of FIG. 1 is shown according to an example embodiment. As shown in FIG. 5, the control system 400 includes a processing circuit 408 having a processor 412 and a memory device 416; a controller 420 having a wheel speed circuit 424, a brake turn circuit 428, and a trailer brake circuit 432; and a communications interface 436. Generally, the control system 400 is structured to receive signals indicative of a current vehicle speed from the wheel speed sensor 404, receive information from the operator interface 40 (e.g., position information of the left brake pedal 126 and the right brake pedal 134), determine is brake turning is allowed or inhibited, and control the intelligent brake turn actuator 198 in response to the determination.

In one configuration, the wheel speed circuit 424, the brake turn circuit 428, and the trailer brake circuit 432 are embodied as machine or computer-readable media that is executable by a processor, such as processor 412. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the wheel speed circuit 424, the brake turn circuit 428, and the trailer brake circuit 432 are embodied as hardware units, such as electronic control units. As such, the wheel speed circuit 424, the brake turn circuit 428, and the trailer brake circuit 432 may be embodied as one or more circuitry components including, but not limited to, processing circuitry, network interfaces, peripheral devices, input devices, output devices, sensors, etc. In some embodiments, the wheel speed circuit 424, the brake turn circuit 428, and the trailer brake circuit 432 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the wheel speed circuit 424, the brake turn circuit 428, and the trailer brake circuit 432 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The wheel speed circuit 424, the brake turn circuit 428, and the trailer brake circuit 432 may also include programmable hardware devices such as field programmable gate arrays, programmable array logic, programmable logic devices or the like. The wheel speed circuit 424, the brake turn circuit 428, and the trailer brake circuit 432 may include one or more memory devices for storing instructions that are executable by the processor(s) of the wheel speed circuit 424, the brake turn circuit 428, and the trailer brake circuit 432. The one or more memory devices and processor(s) may have the same definition as provided below with respect to the memory device 416 and processor 412. In some hardware unit configurations, the wheel speed circuit 424, the brake turn circuit 428, and the trailer brake circuit 432 may be geographically dispersed throughout separate locations in the vehicle. Alternatively and as shown, the wheel speed circuit 424, the brake turn circuit 428, and the trailer brake circuit 432 may be embodied in or within a single unit/housing, which is shown as the control system 400.

In the example shown, the control system 400 includes the processing circuit 408 having the processor 412 and the memory device 416. The processing circuit 408 may be structured or configured to execute or implement the instructions, commands, and/or control processes described herein with respect to wheel speed circuit 424, the brake turn circuit 428, and the trailer brake circuit 432. The depicted configuration represents the wheel speed circuit 424, the brake turn circuit 428, and the trailer brake circuit 432 as machine or computer-readable media. However, as mentioned above, this illustration is not meant to be limiting as the present disclosure contemplates other embodiments where the wheel speed circuit 424, the brake turn circuit 428, and the trailer brake circuit 432, or at least one circuit of the wheel speed circuit 424, the brake turn circuit 428, and the trailer brake circuit 432, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 412) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., wheel speed circuit 424, the brake turn circuit 428, and the trailer brake circuit 432 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 416 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 416 may be communicably connected to the processor 412 to provide computer code or instructions to the processor 412 for executing at least some of the processes described herein. Moreover, the memory device 416 may be or include tangible, non-transient volatile memory or non-volatile memory. Accordingly, the memory device 416 may include database components, object code components, script components, or any other type of information structure for supporting the various activities and information structures described herein.

The wheel speed circuit 424 is structured to receive information from the wheel speed sensor 404 (e.g., one or more wheel speed sensors, real or virtual sensors, etc.) via the communications interface 436 and determine a current vehicle speed over the ground. A brake turn threshold speed is stored by the memory device 416, and the wheel speed circuit 424 compares the current vehicle speed to the brake turn threshold speed. The wheel speed circuit 424 outputs a brake turn allowed signal when the current wheel speed is less than or equal to the brake turn threshold speed. The wheel speed circuit 424 outputs a brake turn inhibited signal when the current wheel speed is greater than the brake turn threshold speed. In some embodiments, the brake turn threshold speed is twelve kilometers per hour (12 kph). In some embodiments, the brake turn threshold speed is greater than 12 kph or less than 12 kph as desired.

The brake turn circuit 428 is structured to receive information from the operator interface 40 via the communications interface 436. In some embodiments, the brake turn circuit 428 receives information from the left brake pedal 126 and from the right brake pedal 134 via the communications interface 436. The brake turn circuit 428 outputs a brake turn request signal when the brake turn circuit 428 receives information indicative of an operator requested brake turn action from the operator interface 40 via the communications interface 436. In some embodiments, the brake turn circuit 428 outputs the brake turn request signal when the left brake pedal 126 is engaged or depressed and the right brake pedal 134 is not depressed, or when the left brake pedal 126 is not depressed and the right brake pedal 134 is depressed. In other words, the brake turn circuit 428 outputs the brake turn request signal when only one brake actuator is applied (e.g., only one brake pedal is depressed). If both the left brake pedal 126 and the right brake pedal 134 are depressed then a normal trailer brake signal is output by the brake turn circuit 428. In some embodiments, the brake turn circuit 428 outputs the normal trailer brake signal if no brake pedal is depressed. In some embodiment, the normal trailer brake signal includes a lack of signal (e.g., a zero volt output).

The trailer brake circuit 432 is structured to receive the brake turn allowed signal or the brake turn inhibited signal from the wheel speed circuit 424, and the brake turn request signal or the normal trailer brake signal from the brake turn circuit 428. The trailer brake circuit 432 outputs, via the communications interface 436, a trailer brake deactivation signal to the intelligent brake turn actuator 198 of the hydraulic trailer brake system 118 when the brake turn allowed signal is received and the brake turn request signal is received. The trailer brake deactivation signal can be received by the solenoid of the intelligent brake turn actuator 198 via the connection 202 (see FIG. 4) and causes the solenoid to move the spool of the intelligent brake turn actuator 198 to the second position so that communication is inhibited between the pilot port 172 and the third pilot of the trailer brake actuator 182 and hydraulic pressure is not provided to the trailer brake work port 170.

The trailer brake circuit 432 outputs, via the communications interface 436, a trailer brake normal operation signal to the intelligent brake turn actuator 198 of the hydraulic trailer brake system 118 when the brake turn inhibited signal is received and the normal trailer brake signal is received. The trailer brake normal operation signal can be received by the solenoid of the intelligent brake turn actuator 198 via the connection 202 (see FIG. 4) and deenergizes the solenoid or otherwise causes the solenoid to allow the spool of the intelligent brake turn actuator 198 to move to the first position so that communication is provided between the pilot port 172 and the third pilot of the trailer brake actuator 182 and hydraulic pressure is provided to the trailer brake work port 170.

While various circuits with particular functionality are shown in FIG. 5, it should be understood that the control system 400 may include any number of circuits for completing the functions described herein. For example, the activities and functionalities of the wheel speed circuit 424, the brake turn circuit 428, and the trailer brake circuit 432 may be combined in multiple circuits or as a single circuit. Additional circuits with additional functionality may also be included. Further, the control system 400 may further control other activity beyond the scope of the present disclosure.

As mentioned above and in one configuration, the "circuits" may be implemented in machine-readable medium for execution by various types of processors, such as the processor 412 of FIG. 5. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

In operation, when the vehicle 10 is travelling above the brake turn threshold speed, brake turning is inhibited and the trailer brakes will be engaged via pressure at the trailer brake work port 170 whenever the left brake pedal 126 and/or the right brake pedal 134 are depressed. When the vehicle is travelling at or below the brake turn threshold speed, a brake turn will be initiated when the operator depresses only one of the left brake pedal 126 or the right brake pedal 134 and the trailer brakes will be inhibited from braking by inhibiting pressurized hydraulic fluid from flowing to the trailer brake work port 170.

Systems, apparatuses, and methods described herein provide advantages including the reduction of parts when compared with mechanically actuated brake turn systems including hydraulic logic circuits for speed detection and brake turn request detection. Additionally, the brake system 110 is more compact than typical brake turn enabled systems because it has fewer parts and connections.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

It is important to note that the construction and arrangement of the vehicle 10 and the systems and components thereof (e.g., the driveline 50, the braking system 110, the control system 200, etc.) as shown in the various exemplary embodiments is illustrative only. Additionally, any element disclosed in one embodiment may be incorporated or utilized with any other embodiment disclosed herein.

What is claimed is:
1. A vehicle, comprising:
a left brake actuator structured to be engaged by an operator to apply left brakes;
a right brake actuator structured to be engaged by the operator to apply right brakes;
a wheel speed sensor structured to provide information indicative of a current vehicle speed of travel over ground of the vehicle;
a service brake system coupled to the left brake actuator and the right brake actuator, selectively providing pressurized hydraulic fluid to the left brakes and the right brakes, and selectively outputting pressure to a pilot port;
a hydraulic trailer brake system comprising:
a priority actuator hydraulically positioned between a pressure supply port and a trailer brake work port,
a trailer brake actuator having an input orifice hydraulically coupled to a priority actuator output and an output orifice hydraulically coupled to the trailer brake work port, and
an intelligent brake turn actuator including a solenoid actuated spool valve that selectively allows or inhibits a flow of pressurized hydraulic fluid to actuate the trailer brake actuator to thereby allow or prevent hydraulic fluid from the priority actuator output to the trailer brake work port, wherein the solenoid actuated spool valve is biased to allow the flow of pressurized hydraulic fluid to the trailer brake work port; and
one or more processing circuits comprising one or more memory devices coupled to one or more processors, the one or more memory devices configured to store instructions thereon that, when executed by the one or more processors, cause the one or more processors to:
determine the current vehicle speed based on the information received from the wheel speed sensor,
compare the current vehicle speed to a brake turn threshold speed, and
actuate the intelligent brake turn actuator to inhibit the flow of pressurized hydraulic fluid to the trailer brake work port when the current vehicle speed is less than the brake turn threshold speed.

2. The vehicle of claim 1, wherein the hydraulic trailer brake system further includes the trailer brake actuator defining a first position allowing the flow of pressurized hydraulic fluid to the trailer brake work port and a second position inhibiting the flow of pressurized hydraulic fluid to the trailer brake work port, and including a second pilot port biasing the trailer brake actuator toward the first position, and wherein the intelligent brake turn actuator selectively allows and inhibits a flow of pressurized hydraulic fluid to the pilot port.

3. The vehicle of claim 1, wherein the intelligent brake turn actuator receives pressurized hydraulic fluid from the service brake system.

4. The vehicle of claim 1, wherein the flow of pressurized hydraulic fluid to the trailer brake work port is received from the priority actuator.

5. The vehicle of claim 1, wherein the one or more memory devices are further configured to store the instructions thereon that, when executed by the one or more processors, cause the one or more processors to:

determine that one of the left brake actuator or the right brake actuator is engaged, generate a brake turn request signal when it is determined that one of the left brake actuator or the right brake actuator is engaged, and actuate the intelligent brake turn actuator to inhibit the flow of pressurized hydraulic fluid to the trailer brake work port when the current vehicle speed is less than the brake turn threshold speed and the brake turn request signal is generated.

6. The vehicle of claim 1, wherein the one or more memory devices are further configured to store the instructions thereon that, when executed by the one or more processors, cause the one or more processors to:

determine that both of the left brake actuator and the right brake actuator are engaged, generate a normal trailer brake signal when it is determined that both of the left brake actuator and the right brake actuator are engaged, and actuate the intelligent brake turn actuator to allow the flow of pressurized hydraulic fluid to the trailer brake work port when the normal trailer brake signal is generated.

7. A hydraulic trailer brake system, comprising:
a service brake system structured to selectively provide pressurized hydraulic fluid to a left service brake and a right service brake, and selectively output pressure to a pilot port;
a trailer brake system comprising:
 a priority actuator hydraulically positioned between a pressure supply port and a trailer brake work port,
 a trailer brake actuator having an input orifice hydraulically coupled to a priority actuator output and an output orifice hydraulically coupled to the trailer brake work port, and
 a solenoid actuated intelligent brake turn actuator selectively allowing or inhibiting a flow of pressurized hydraulic fluid to actuate the trailer brake actuator to thereby allow or prevent hydraulic fluid from the priority actuator output to the trailer brake work port, wherein the solenoid actuated intelligent brake turn actuator is biased to allow the flow of pressurized hydraulic fluid to the trailer brake work port; and
one or more processing circuits comprising one or more memory devices coupled to one or more processors, the one or more memory devices configured to store instructions thereon that, when executed by the one or more processors, cause the one or more processors to:
 determine a current vehicle speed based on information received from a wheel speed sensor,
 compare the current vehicle speed to a brake turn threshold speed, and
 actuate the solenoid actuated intelligent brake turn actuator to inhibit the flow of pressurized hydraulic fluid to the trailer brake work port when the current vehicle speed is less than the brake turn threshold speed.

8. The hydraulic trailer brake system of claim 7, wherein the solenoid actuated intelligent brake turn actuator includes a two position, two-way spool valve defining a first position providing flow therethrough and a second position inhibiting flow therethrough, a spring biasing the two position, two-way spool valve toward the first position, and a solenoid operable by the one or more processing circuits to move the two position, two-way spool valve to the second position against the bias of the spring.

9. The hydraulic trailer brake system of claim 7, wherein the hydraulic trailer brake system further includes the trailer brake actuator defining a first position allowing the flow of pressurized hydraulic fluid to the trailer brake work port and a second position inhibiting the flow of pressurized hydraulic fluid to the trailer brake work port, and including a second pilot port biasing the trailer brake actuator toward the first position, and wherein the solenoid actuated intelligent brake turn actuator selectively allows and inhibits a flow of pressurized hydraulic fluid from the service brake system to the pilot port.

10. The hydraulic trailer brake system of claim 7, wherein the solenoid actuated intelligent brake turn actuator receives pressurized hydraulic fluid from the service brake system.

11. The hydraulic trailer brake system of claim 7, wherein the flow of pressurized hydraulic fluid to the trailer brake work port is received from priority actuator.

12. The hydraulic trailer brake system of claim 7, wherein the one or more memory devices are further configured to store the instructions thereon that, when executed by the one or more processors, cause the one or more processors to:

generate a brake turn request signal when pressurized hydraulic fluid is provided to one of the left service brake or the right service brake, and actuate the solenoid actuated intelligent brake turn actuator to inhibit the flow of pressurized hydraulic fluid to the trailer brake work port when the current vehicle speed is less than the brake turn threshold speed and the brake turn request signal is generated.

13. The hydraulic trailer brake system of claim 7, wherein the one or more memory devices are further configured to store the instructions thereon that, when executed by the one or more processors, cause the one or more processors to:

generate a normal trailer brake signal when hydraulic fluid is provided to both of the left service brake and the right service brake, and actuate the solenoid actuated intelligent brake turn actuator to allow the flow of pressurized hydraulic fluid to the trailer brake work port when the normal trailer brake signal is generated.

14. An apparatus, comprising:
one or more processing circuits comprising one or more memory devices coupled to one or more processors, the one or more memory devices configured to store instructions thereon that, when executed by the one or more processors, cause the one or more processors to:

determine a current vehicle speed based on information received from a wheel speed sensor;

compare the current vehicle speed to a brake turn threshold speed;

receive a left service brake signal from a service brake system;

receive a right service brake signal from the service brake system; and actuate an intelligent brake turn actuator of a hydraulic trailer brake system to inhibit a flow of pressurized hydraulic fluid to actuate a trailer brake actuator to thereby allow or prevent hydraulic fluid from a priority actuator output to a trailer brake work port when the current vehicle speed is less than the brake turn threshold speed and one of the left service brake signal or the right service brake signal is received, wherein the intelligent brake turn actuator is biased to allow the flow of pressurized hydraulic fluid to the trailer brake work port.

15. The apparatus of claim 14, wherein the intelligent brake turn actuator includes a two position, two-way spool valve defining a first position providing flow therethrough and a second position inhibiting flow therethrough, a spring biasing the two position, two-way spool valve toward the first position, and a solenoid operable to move the two position, two-way spool valve to the second position against the bias of the spring, and wherein actuation of the intelligent brake turn actuator includes energizing the solenoid.

16. The apparatus of claim 14, wherein the left service brake signal is received from a left brake by wire pedal, and wherein the right service brake signal is received from a right brake by wire pedal.

17. The apparatus of claim 14, wherein the one or more memory devices are further configured to store the instructions thereon that, when executed by the one or more processors, cause the one or more processors to:

generate a brake turn request signal when one of the left service brake signal or the right service brake signal is received, and actuate the intelligent brake turn actuator to inhibit the flow of pressurized hydraulic fluid to the trailer brake work port when the current vehicle speed is less than the brake turn threshold speed and the brake turn request signal is generated.

18. The apparatus of claim 14, wherein the one or more memory devices are further configured to store the instructions thereon that, when executed by the one or more processors, cause the one or more processors to:

generate a normal trailer brake signal when both the left service brake signal and the right service brake signal are received, and actuate the intelligent brake turn actuator to allow the flow of pressurized hydraulic fluid to the trailer brake work port when the normal trailer brake signal is generated.

19. The apparatus of claim 14, wherein the brake turn threshold speed is twelve kilometers per hour.

* * * * *